July 8, 1969 E. W. VOORHOEVE 3,454,894

STABILIZATION OF DRAIN-ELECTRODE CURRENT OF INSULATED-GATE FIELD-EFFECT TRANSISTOR

Filed Nov. 24, 1965

United States Patent Office 3,454,894

Patented July 8, 1969

3,454,894

STABILIZATION OF DRAIN-ELECTRODE CURRENT OF INSULATED-GATE FIELD-EFFECT TRANSISTOR

Ernst W. Voorhoeve, Maple Glen, Pa., assignor to Leeds & Northrup Company, Philadelphia, Pa., a corporation of Pennsylvania Filed Nov. 24, 1965, Ser. No. 509,525
Int. Cl. H03f *3/68, 3/14*
U.S. Cl. 330—30 4 Claims

ABSTRACT OF THE DISCLOSURE

Various circuits are disclosed for providing between the substrate and source-electrodes of an insulated-gate field-effect transistor a DC bias of polarity preselected in dependence upon the substrate material—specifically, a positive bias for N-type substrate and a negative bias for P-type substrate—and of magnitude to minimize sensitivity of the transistor to external transient potentials and/or tendency for a long-term drift of the drain-electrode current.

This invention concerns amplifier circuits using at least one insulated-gate field-effect transistor, i.e., a transistor having a body or substrate of one type of semiconductor material and supporting a pair of islands, both of opposite type of semiconductor material, respectively connected to source and drain electrodes, and spaced to provide a conducting channel with which the insulated-gate electrode is associated.

Previous amplifier circuits employing insulated-gate field-effect transistors have had unpredictable operating characteristics. Many of such transistors, for reasons not yet fully understood, are subject in operation to abruptly-occurring and long-persisting shifts of the drain-electrode current and/or slow shifts or long-term drifts of such current. In consequence of such instability, the operation of an amplifier including at least one of such transistors is degraded or suspended for periods of random duration. Moreover, weeding out of those transistors which exhibit such unstable characteristics during factory test of a supposedly-similar batch of them does not insure that the selected remaining transistors will not subsequently exhibit such instability.

In accordance with the present invention, stable, predictable operation of an amplifier employing one or more insulated-gate field-effect transistors is insured by connection, between the source-electrode and a body-electrode, of a DC voltage which is poled in dependence upon the type substrate. Specifically, for a transistor having an N-type substrate, the DC bias should be so poled that the body or substrate-electrode is positive with respect to the source-electrode: conversely, for a transistor having a P-type substrate, the bias poling should be such that the body or substrate-electrode is at negative potential with respect to the source-electrode.

Further in accordance with the invention, the bias between the substrate and source-electrodes may be derived directly, or preferably by regulator circuitry, from the DC source which also supplies the drain-electrode current of the transistor.

The invention further resides in stabilizing methods and circuitry having features of novelty and utility hereinafter described and claimed.

Figure 1:
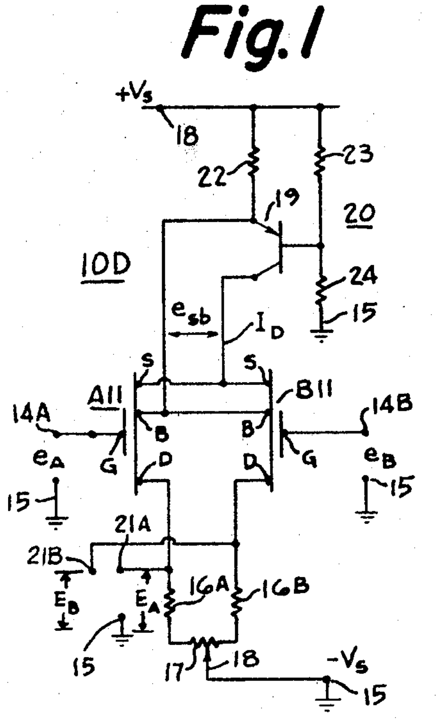
Figure 2:
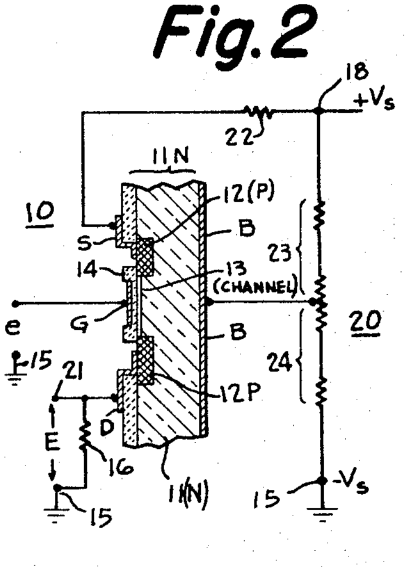
Figure 4:
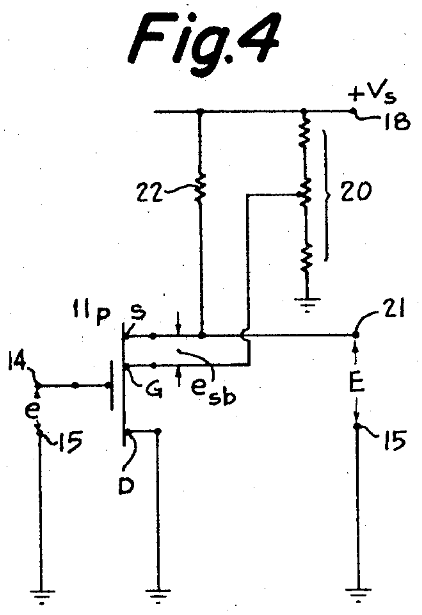
Figure 3:
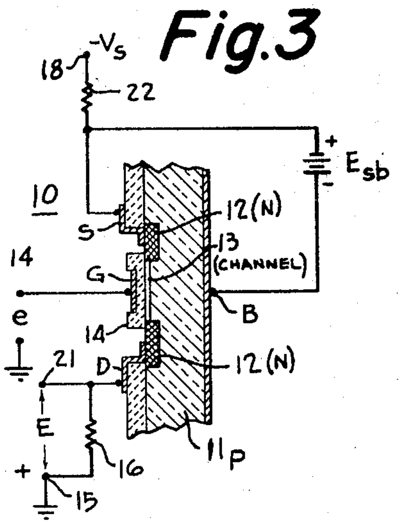

For a more detailed understanding of the invention, reference is made to the following description of various embodiments thereof and to the accompanying drawings in which:

FIG. 1 is a circuit diagram of a differential-amplifier stage including a pair of insulated-gate transistors stabilized against transient pickup and flow shift or drift effects by a DC bias between its substrate and source-electrodes;

FIGS. 2 and 3 respectively illustrate typical constructions of P-channel and N-channel types of insulated-gate transistors and associated amplifier circuitry with various specifically different stabilizing arrangements; and FIG. 4 is a circuit diagram of another type of amplifier circuit including an insulated-gate transistor with stabilizing bias applied between its substrate and source-electrodes.

Although technical literature indicates that insulated-gate field-effect transistors have been known for some time, their adoption for commercial use has heretofore been negligible despite their desirable high input-impedance. In tests on a batch of such transistors of P-channel type, supposedly of similar characteristics, all but a few of them, when their body-electrodes were left floating or connected directly to the source-electrodes as recommended by their manufacturers, exhibited (a) high sensitivity to transient potentials picked up by their gate-electrodes with consequent abrupt shifts of their drain-current to random values from which they slowly returned after an hour or more; and/or (b) slow shift or long-term drift, of the order of days or more, of the drain current. The magnitudes of such shift and drift effects, as shown by the test charts, are so much as to be intolerable in functional amplifiers such as used in analog circuitry and also in binary or switching circuit applications requiring high reliability. The reasons for such random, erratic behavior of insulated-gate transistors are not fully understood, but is believed probably due to the presence, migration or formation of ions in the metal-oxide layer used to isolate the gate-electrode from the channel. In any event, it has now been established that such instability of operation of insulated-gate transistors can be prevented or minimized by continuously providing between the substrate and source-electrodes a potential-difference preselected in accordance with the type substrate. Specifically, for insulated-gate transistors having a substrate of N-type semiconductor, the body-electrode should be maintained at positive potential with respect to the source electrode. The magnitude of this stabilizing DC bias should be kept sufficiently below the breakdown voltage between the substate and the island of opposite type semiconductor contacted by the source-electrode. Specifically, for the type 2N3609 transistor, it was found that such bias need not exceed about 10 volts and a suitable minimum is about 5 volts. It is believed a suitable stabilizing value or range of values for a properly poled bias voltage between the substrate and source-electrodes depends upon the dimensions and compositions of the semiconductor, and in a particular case may be empirically determined by progressively increasing such bias while the gate-electrode circuit is exposed to an intermittent intense charging field such as produced, for example, by rapidly making and breaking an adjacent power circuit. It may here be noted that such body/source-electrode bias has no effect upon the temperature-dependence of the transistors, and consequently other steps should be taken to reduce temperature-dependence when required by the operational environment.

For insulated-gate transistors having a P-type substrate, the body or substrate-electrode should be maintained at negative potential with respect to the source-electrode.

It also has been found that a body/source bias suited in polarity and magnitude to stabilize erratic transistors of a batch would not degrade the operation of the other transistors of that batch. It has thus become feasible to design and manufacture standard amplifier circuits in which any of the transistors of a given class or type could be incorporated with assurance that the amplifiers as tested in the factory or as used in the field would exhibit a minimum of erratic random shift and/or drift characteristics typical of amplifiers using one or more insulated-gate field-effect transistors.

It may here be noted that other attempts to stabilize the operation of insulated-gate transistors having either no connection to the substrate-electrode or a direct connection from such electrode to the source-electrode were unsuccessful. For example, it was found that connection by a relatively large capacitance from the gate-electrode to ground had no effect upon long-term drift of the drain-current, did not appreciably reduce the recovery time of the drain-current after spurious response to a voltage transient picked up by the gate-electrode, and degraded the rise time of the drain-current response to a rapidly-changing input signal.

In FIG. 1, the invention is shown as embodied in the dual channel input stage 10D of a differential amplifier or comparator. Each of the transistors A11, B11 is of the insulated-gate field-effect type, having for the indicated poling of the supply source $V_S$ a P-type channel. Specifically, the body or substrate of each of these transistors (see FIG. 2) is of N-type semiconductor material, such as silicon, which has been suitably doped and supports the two islands 12 which are of P-type semiconductor material. The source-electrode S is in ohmic contact with one of these islands and the drain electrode D is in ohmic contact with the other island. The conduction channel 13 between the islands 12, 12 is of P-type, as above stated. The gate-electrode G overlies the channel 13 but is conductively isolated therefrom by the intervening portion 14 of the metallic oxide layer. Such layer is usually thermo-formed on one side of the substrate. The body-electrode B is in ohmic contact with the opposite side of the substrate and may be formed by the housing of the transistor or may be formed on the substrate by metallic vapor deposition, the usual process for forming the gate, source and drain-electrodes.

Reverting to FIG. 1, the gate-electrode G of transistor A11 is connected to the input terminal 14A of the A-input channel of the amplifier and the gate-electrode G of transistor B11 is connected to the input terminal 14B of the B-channel. One of the input voltages $e_A$, $e_B$ may be an analog signal voltage representative of a measured variable, and the other of them may be a reference voltage so that the amplifier may be used for comparison purposes generally as in the comparison amplifier of copending application Ser. No. 457,610 upon which has issued U.S. Letters Patent 3,387,224.

In the circuit shown in FIG. 1, the load resistors 16A, 16B are respectively connected from the drain-electrodes D of transistors A11, B11 to the common terminal 15 of the amplifier. To provide for balancing of the drain-currents of transistors A11, B11 prior to use of the amplifier or from time to time during use, the opposite ends of a potentiometer resistor 17 are respectively connected to the lower ends of the load resistors 16A, 16B and its slider or relatively adjustable contact 18 is connected to the common or ground terminal 15 of the amplifier. For standardization, equal input voltages $e_A$, $e_B$ are applied and the contact is set to obtain equality of the drain-electrode voltages $E_A$, $E_B$ as appearing between the common terminal 15 and the respective output terminals 21A, 21B or to obtain a zero difference of such voltages as appearing across the output terminals 21A, 21B.

The drain-current $I_D$ of the transistors A11, B11 is supplied from a battery or other regulated DC source $V_S$ whose negative terminal is connected to grounded terminal 15 of the amplifier and whose ungrounded positive terminal 18 is connected to the source-electrodes S of the transistors. To maintain constancy of the total drain-electrode current $I_D$, it is supplied to the source-electrodes via a current-regulator arrangement: specifically, in the circuit shown in FIG. 1, the current-regulator includes the junction type transistor 19 whose base-electrode is maintained at a fixed preselected DC voltage by connection to a tap point of the potential-divider network 20 formed by resistors 23, 24 connected across the supply terminals 15, 18. The collector of transistor 19 is connected to the source-electrodes S of the insulated-gate transistors A11, B11 and the emitter of transistor 19 is connected to the terminal 18 of supply source $V_S$ via the resistor 22 which serves to provide a bias for the junction transistor 19.

With the body-electrodes B of both transistors A11, B11 connected to the emitter of the current-regulator transistor 19, the resistor 22 also serves as a voltage-dropping resistor in the path to the source-electrode and the bias $e_{sb}$ between the source and substrate-electrodes is equal to the internal voltage drop of transistor 19. With the body-electrodes connected to terminal 18 of the supply source $V_S$, the body/source electrode bias additionally includes the voltgae drop across the resistor 22. In either case, the substrate or body-electrode B of each of the N-type substrate insulated-gate transistors A11, B11 is of positive potential with respect to the associated source-electrode S. With the drain current held constant by the regulator network 19, 20, 22, the stabilizing bias $e_{sb}$ is maintained constant. This insures that the differential-output voltage between terminals 21A, 21B continuously accurately represents the difference between the input voltages $e_A$,$e_B$ even though either or both of transistors A11, B11 could otherwise exhibit the spurious changes of channel conductance above discussed.

Suitable components and parameters of the circuit of FIG. 1 are given in Table I below.

TABLE I

Resistors:
- 16A, 16B—50 kilohm (1%)
- 18—5 kilohm (pot.)
- 22—15 kilohm
- 23—6.8 kilohm
- 24—15 kilohm Transistors:
- A11—dual MOS-FET
- B11—2N3609
- 19—2N3638 or 2N3702

Source:
- $V_S$—16 volts

The differential-amplifier circuit of FIG. 1 may be used with insulated-gate transistors having P-type substrate by reversing polarity of the drain-current source $V_S$ and by replacing the PNP junction type transistor 19 with one of the NPN type.

The invention is not limited in its application to differential amplifiers. In FIGS. 2 and 3, the amplifier stage 10 is of the single-ended type with corresponding elements identified by the same reference characters as in FIG. 1 but without subscripts identifying the different channels. In FIG. 2 employing an insulated-gate transistor 11N with N-type substrate, the body-electrode B is maintained at positive potential with respect to the source electrode S by connection of the body-electrode B to a suitable tap point on the potential-divider network 20 in dependence upon the selected values of load resistor 16 and the voltage-dropping ressitor 22. In the single-ended ampliler of FIG. 2, the body/source electrode-bias varies with load: consequently the values of resistors 22, 23 and 24 should be selected to maintain the stabilizing bias $e_{sb}$ in a range which for the minimum value of signal voltage $e$ is sufficient to prevent undue sensitivity of the gate-electrode to transient external fields. The circuit shown in FIG. 2 may be used with an insulated-gate transistor having P-type substrate by simply reversing the polarity of the source $B_S$.

The amplifier circuit shown in FIG. 3 is similar to that of FIG. 2 except in respect to points now discussed. Since the insulated-gate transistor 11P of FIG. 3 has P-type substrate, the source-electrode S is connected to the negative terminal of the drain-current supply source $V_S$. The body-electrode B is maintained at negative potential with respect to source-electrode S by a separate source exemplified by battery $E_{sb}$ instead of using voltage-divider 20 of FIG. 2. With a separate source for the body/source bias, the bias remains constant with changes in load when the dropping resistor 22 is external to the bias circuit as shown. A similar separate bias source and dropping resistor arrangement may also be used in FIG. 2 but the polarity of the bias source should, of course, be reversed.

In the amplifier circuits of FIGS. 1 to 3, the output terminal 21 is connected to the drain-electrode and the load resistor is connected between the drain-electrode D and the grounded terminal of the amplifier. The invention, however, is not limited to such amplifier circuit configuration. For example, in FIG. 4, the output terminal 21 is connected to the source-electrode S of insulated-gate transistor 11P, and resistor 22 serves as at least part of the load resistor—wholly so if the drain-electrode D is directly grounded as shown—and also as part of the stabilizing bias for the body-electrode G whether such body-electrode be connected to a potential-divider 20 across the drain-current source or to a separate properly poled voltage source $E_{sb}$ (FIG. 3).

It shall be understood the invention is not limited to the amplifier circuits specifically shown and described and also covers circuitry within the scope of the appended claims.

What is claimed is:

1. An amplifier including at least one insulated-gate field-effect transistor of P-channel type with N-type substrate having gate, grain, source and substrate-electrodes characterized in that means are provided to maintain the substrate-electrode at a positive DC potential with respect to the source-electrode, and of magnitude sufficient to minimize sensitivity of the transistor to external transient voltages picked up by its gate-electrode and to minimize any tendency for long-term drift of the drain-electrode current.

2. An amplifier as in claim 1 in which a pair of said transistors is included in one stage of a differential amplifier with their source-electrodes connected to the corresponding polarity terminal of the source of drain-electrode current via a drain-current regulating circuit including an NPN junction-type transistor whose base-electrode is connected to a potentional-divider network across the drain-current source, and in which said positive DC potential between said substrate and source-electrodes at least in part comprises the internal voltage-drop of said junction-type transistor.

3. An amplifier including at least one insulated-gate field-effect transistor of N-channel type with P-type substrate having gate, drain, source and substrate electrodes characterized in that means are provided to maintain the substrate-electrode at a negative DC potential with respect to the source electrode, and of magnitude sufficient to minimize any tendency for long-term drift of the drain electrode current.

4. An amplifier as in claim 3 in which a pair of said transistors is included in one stage of a differential amplifier with their source electrodes connected to the corresponding terminal of drain-electrode current via a drain regulating circuit including a junction type transistor whose base electrode is connected to a potential-divider network across the drain-current source, and in which said negative DC potential between said substrate and source electrodes at least in part comprises the internal voltage-drop of said junction-type transistor.

References Cited

Griswold: "Understanding and Using the Mosfet," Electronics, Dec. 14, 1964.

"New Circuit Ideas to Help You," Electronic Design, January 1964.

ROY LAKE, *Primary Examiner.*

LAURENCE J. DAHL, *Assistant Examiner.*

U.S. Cl. X.R.

330—38